June 16, 1953  H. F. HALL  2,641,984
ROTARY MOLDBOARD PLOW
Filed March 29, 1947
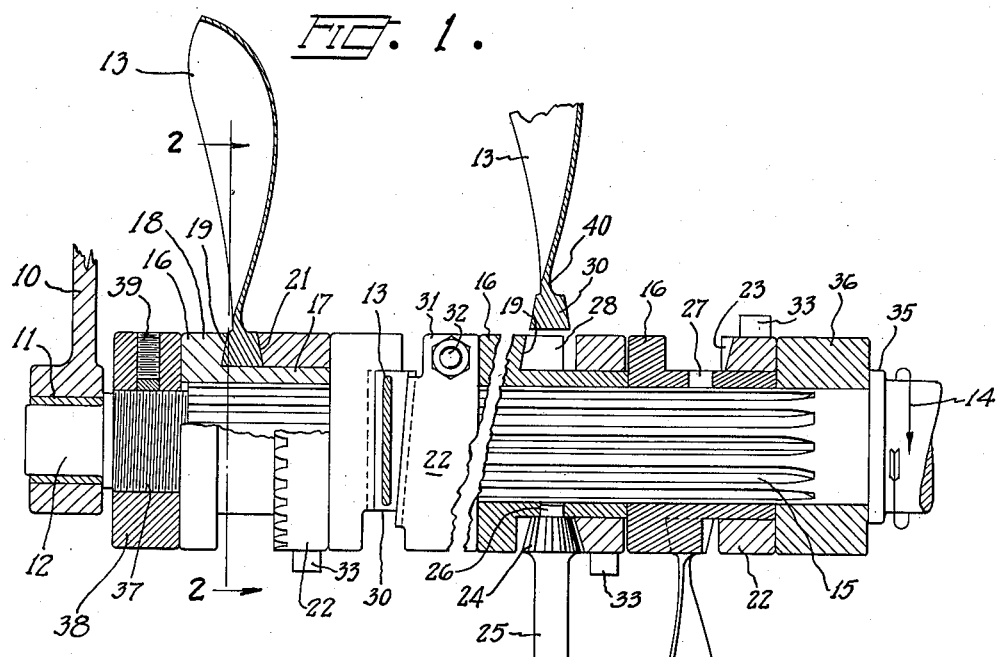
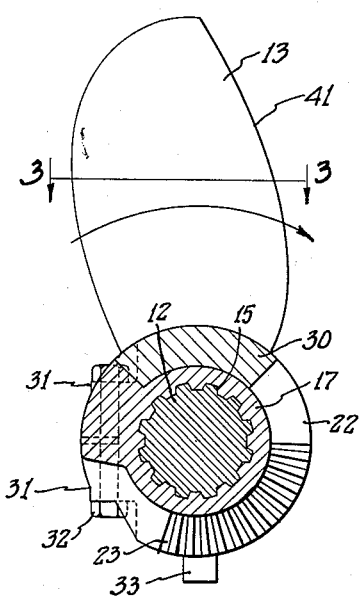
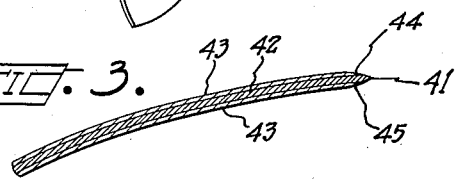
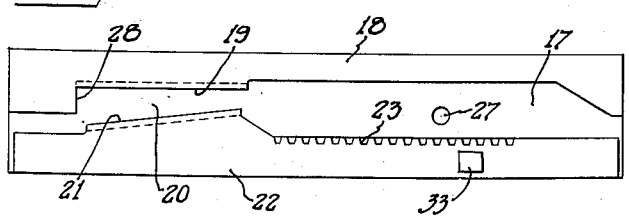
INVENTOR
HAROLD F. HALL
BY Cook and Schermerhorn
ATTORNEYS Patented June 16, 1953

2,641,984

UNITED STATES PATENT OFFICE 2,641,984

ROTARY MOLDBOARD PLOW

Harold F. Hall, Portland, Oreg.

Application March 29, 1947, Serial No. 738,114

8 Claims. (Cl. 97—212)

This invention relates to improvements in rotary plows for cutting, pulverizing and mixing soil, grain stubble and corn stalks, as well as fertilizer, cover crops and other vegetable matter.

The general object of the invention is to provide an improved rotary plow construction having a series of cutting blades which are individually removable to facilitate replacement when any of the blades become damaged. Other objects are to provide a rotary plow construction in which the arrangement of the blades may be varied to suit different conditions and purposes, to provide improved means for clamping the blades individually on the cutter shaft in adjusted position, to provide a versatile construction which may also be used for mounting non-rotating earth working blades, and to provide novel self-sharpening blades.

The present plow is designed to till the soil in a manner similar to the action of the conventional moldboard plow leaving the soil in rough furrows, but it can also be adjusted to pulverize the soil, the plowing action being controllable to meet the requirements of the particular soil at the particular season when the ground is worked. The construction is such as to render the adjustment for different types of plowing action simple and quickly accomplished. This versatility is obtained by the use of removable blades which may be affixed in different arrangements to a power driven shaft mounted in a plow frame to be hitched to a farm tractor. By using more or fewer blades, by varying the angular spacing of the blades on the shaft, and by changing the speed of rotation of the shaft, the plowing action may be controlled so that it is possible with one plow to accomplish different types of work ordinarily requiring various implements used in succession. The rotary cutting action of the present plow enables soil to be worked that would be too wet to be cultivated by conventional methods. The motive power may be mounted on the plow unit itself or it may be supplied from the power take-off of the tractor which is used to pull the plow. The speed of the rotor may be adjusted by suitable mechanism to produce the kind of action desired with a particular number and arrangement of cutter blades.

The individual cutter blades are constructed of laminated steel of different hardness which may comprise two layers to present a hard front face surface and a relatively softer back surface, or three layers having a hard inner layer with relatively soft front and back surfaces. Either form of laminated construction renders the blade self-sharpening by the abrasive action of the ground. These cutter blades are relatively inexpensive individually and are designed to be easily secured in or removed from socket-like holders or clamps associated with the shaft. The blades are of sturdy construction to handle heavy and difficult soils. Ordinary rock does not too seriously interfere with the operation, but if a cutter blade is sheared off or damaged by a large boulder it may be easily replaced in the field with a new blade.

The shape of the blades, their arrangement on the shaft and their specific construction are all important in accomplishing the desired cutting, pulverizing and mixing action. The shape of the blades is such as to cause the cutting edges to cut through the soil rather than to pry or tear it apart, the cutting edges cutting out slices of soil on each revolution of the cutter with the curved moldboard surfaces of the blades carrying the soil to the rear and throwing it against the apron which encloses the cutter to break up lumps and clods. The blades are shaped to a compound curve so that when they are spaced apart longitudinally on the shaft they may be used to turn over sod in furrows in the same manner as a conventional moldboard plow, and when placed close together and driven at high speed they are effective to make a pulverized seed bed ready for immediate planting, whereby in the latter case one plow with suitable adjustments may be used to perform the work of the conventional plow, disc and harrow, all in the same operation. Also, a seeder may be attached directly behind the plow to accomplish immediately the sowing of ground which could not be worked until a late date in the spring. The plow is also well suited to cultivate orchard tracts and similar lands on which cultivating implements are ordinarily used.

In some regions, the soil requires plowing that leaves heavy clods which are allowed to disintegrate by the winter rains and other weathering action, and the present plow can easily be adjusted to accomplish this purpose. Then by merely adding more cutter blades and increasing the speed of the rotor a different result can be accomplished in which the soil may be prepared to a fineness comparable to greenhouse screening to retard the upward capillary movement of moisture from the subsoil. This seed bed texture of the soil need not be limited to the surface layer but may be extended down to the depth of the blades beneath the ground surface. Improved results in seed bed preparation are thereby obtained. Moisture is held in the soil more effectively and is more evenly distributed to prevent evaporation, and at the same time complete aeration of the soil is facilitated.

The shape of the cutter blades is such as to cause the least possible resistance or ground friction to thereby reduce the amount of power required to turn over the soil. Cover crops and fertilizers can be mixed into the soil at various depths as desired, by adjusting the height of the cutter shaft, and grain stubble and stalks can be cut into lengths of from one to four inches depending upon the number of blades used and the speed of rotation at which the blades are driven. Straw fertilizers and cover crops are cut to such fineness that they immediately start to decompose and leave no lumps, bunches or wads which are especially objectionable in seed beds. The fineness of the cutting action and the thoroughness and uniformity of the mixing of the vegetation and soil are among the outstanding advantages of the present plow. The soil thus prepared absorbs excessive rain and permits drainage through the loose soil without a tendency to wash the soil.

With this type of plow, there is no need for a hydraulic lift to lift the plow out of the ground at the end of the field, since by the mere releasing of levers which hold the plow down, the cutter blades immediately work themselves to the surface of the ground. The turning of the power unit at the corners of the field does not interfere with the effective use of the plow which may be left in the ground on turns. The plow may be run backward or forward on the ground.

The invention will be better understood with reference to the accompanying drawings illustrating a preferred embodiment of the invention in which:

Figure 1 is a longitudinal sectional view showing a portion of the length of the present plow with certain parts shown in elevation;

Figure 2 is a cross sectional view taken approximately on the line 2—2 of Figure 1;

Figure 3 is a sectional view of one of the blades taken on the line 3—3 of Figure 2; and Figure 4 is a developed view of a collar and associated ring showing the means for clamping the blade on the shaft.

The drawings illustrate the details of construction for mounting a plurality of cutter blades in different angular positions along a shaft which is adapted to be mounted in a frame to be hitched behind a tractor with the shaft driven by some means such as, for instance, a power take-off from the tractor. The numeral 10 designates a portion of the plow frame having a bearing 11 for mounting a shaft 12 carrying a plurality of cutter blades 13. Rotation is imparted to the shaft in the direction of the arrow 14 by a suitable variable speed driving mechanism, not shown. The shaft 12 is preferably mounted at right angles to the line of draft with the rotation being in the direction of roll but at a speed considerably faster than the translational ground speed of the plow, whereby the blades are caused to cut down into the new soil and backwardly beneath the shaft to throw the cut material out to the rear and upwardly against the enclosing apron which is ordinarily provided on rotary plows. With this direction of rotation the knife-like cutting edges of the blades chop the stubble or cover crop down against the ground for the most effective cutting action and discharge this material along with the clods of earth forcibly against the apron to break the clods and finely divide all the material. It is to be understood, however, that it is within the scope of the invention to mount the plow shaft at other angles with respect to the line of draft and to reverse the line of draft with respect to the direction of rotation so that the blades travel forwardly and upwardly through the soil if desired.

The shaft 12 is provided with longitudinal splines 15 to receive a series of splined collars 16 in end abutting relation along the length of the shaft. The number of splines is sufficient to permit a large variety of angular positions of the collars on the shaft. It is, of course, understood that keys may be used instead of splines to hold the collars in the desired angular positions. Each collar has a cylindrical sleeve portion 17 on one end and a flange 18 on the other end, the latter being provided with an inclined wedging surface 19 forming one side of a tapered dovetail slot 20. The other side of the slot 20 is formed by an inclined and angularly disposed wedging surface 21 on a ring 22 which is rotatably mounted on the sleeve portion 17 of the collar. The ring 22 may be rotated by teeth 23 engaged by gear teeth 24 on a locking tool 25. This tool has a cylindrical stud 26 on its end forming a journal which is receivable in a circular hole 27 which forms a bearing for the tool in the collar. Thus, by rotating the tool 25 the inclined wedging surface 21 on the ring 22 may be moved toward or away from an abutment 28 on the collar at one end of the wedging surface 19.

The dovetail slot 20 thereby forms an expansible and contractible socket to receive a complementary tapered dovetail base 30 on a blade 13. The cylindrical surface of the sleeve 17 forms an arcuate bottom in this socket, the abutment 28 forms one end wall and the wedging surfaces 19 and 21 form the opposite side walls, whereby when the ring 22 is tightened on the blade base 30 when the latter is positioned against the abutment 28 the blade is firmly clamped in place against the action of centrifugal force and the resistance of the soil against the blade. The torque of the shaft is transmitted to each blade through the abutment 28, the wedging surfaces 19 and 21 serving primarily to resist the action of centrifugal force and to hold the blade base seated securely in the socket. The rings 22 are split longitudinally and provided with a pair of apertured ears 31 to receive clamping bolts 32 to hold them in position after they have been tightened by the tool 25. The inclined sides of the blade base 30 conform with the angles of the wedging surfaces 19 and 21 so that these parts fit snugly when they are tightened. If desired, each ring 22 may also have an integral lug 33 which may be struck by a hammer to loosen the ring after it has been clamped in one position so long as to become fast to the collar.

When each ring 22 is tightened it bears against the shoulder 18 on the next collar whereby the end thrust from the clamping actions of the several collars and rings is transmitted to the ends of the shaft. A flange 35 and spacing ring 36 forms an abutment for this thrust on one end of the shaft, and the other end of the shaft is threaded at 37 to receive a nut 38 which is tightened to hold the collars together. The nut 38 may be locked by a set screw 39 or other device. Any blade may be easily and quickly removed by simply loosening the clamping bolt 32 and then rotating the ring 22 until the blade base can be lifted out of its arcuate socket. The loosening or removal of one blade does not have any effect upon the other blades inasmuch as the series of collars 16 remains tight on the shaft independently of the blades. Thus, blades may be removed or added as desired to produce different results with the plow on different types of soil and for different purposes. The end of the shaft beyond the flange 35 contains a journal for a bearing similar to the bearing 11, and a drive sprocket or gear.

The present plow is called a rotary moldboard plow because each blade 13 is shaped with a compound curvature to cut and turn the soil or sod in somewhat the manner of a conventional moldboard plow, although the present plow is also capable of producing effects beyond the limitations of the ordinary moldboard plow. As shown in Figure 1, each blade 13 is straight and directed at right angles to the shaft in its base portion 40 adjacent the base 30. Outwardly from this base portion the blade is curved in two directions and provided with a cutting edge 41 to cut the soil and turn it over. Thus, the blade is curved both in a radial direction and also in a transverse direction so as to present a spiral surface having sufficient pitch to move or deflect the soil in an axial direction to assist in the movement of turning it over. This double curvature also greatly strengthens and stiffens the blade. The blades may also be formed with radial or transverse ribs to impart still greater stiffness if desired. When the blades are spaced far apart on the shaft and are revolved relatively slowly, the soil may be turned over in furrows but with the sods broken up to a greater extent than would be accomplished by the conventional moldboard plow. This mode of operation is accomplished by merely removing the blades from certain of the collars 16 so that there will be fewer blades on the shaft with consequently greater spacing between adjacent blades.

When it is desired to work the soil into a fine condition, as for seed bed preparation, or to finely chop grain stubble or a cover crop, a blade is secured on each of the collars and a higher rotational speed is used. With this arrangement of the blades they are too close together to leave well defined furrows and so the soil is thoroughly broken up and left in a finely divided condition with a relatively flat and even ground surface. The angular relation of the different blades on the shaft may be changed at any time by removing the nut 38 and taking all the collars off the shaft. This is ordinarily not necessary, however, as the various collars may be placed on the shaft in the first place in suitable angular positions for a large number of blades so that certain blades may be removed without disturbing the remaining blades.

In the illustrated embodiment the blades are all pitched uniformly to move the soil in the same direction after the manner of conventional spiral rotary plows to create a single furrow, but an advantage of the present construction is that by installing blades of the opposite pitch the soil may be moved in the opposite direction to put the furrow on the other side of the plowed strip as may be desired in hillside plowing. Also groups of blades may be pitched in opposite directions to create a plurality of furrows if desired. It is also possible to mount all the blades in line on the same side of the shaft and lock the shaft against rotation to form a non-rotating moldboard gang plow, the individual blades being pitched either in the same or opposite directions. In this use of the shaft as a stationary mounting means it is within the contemplation of the invention to mount still other types of blades on the individual collars, such as plow shares, or cultivator or harrow blades. The present construction is thus to be considered as a versatile mounting which is not limited to the specific arrangement or type of blade illustrated.

The blades are preferably of laminated construction having either two or three layers of steel of different hardness. If two layers are used, a single bevel is formed on the cutting edge as the softer metal wears away faster than the hard metal, and if three layers are used with the hard metal in the center as shown in Figure 3 a double bevel is formed on the cutting edge 41. In this form of blade the inside layer 42 is formed of steel which is very hard and wear resistant, while the outer layers 43 are relatively softer. As the softer outside layers wear back faster than the hard central layer, two beveled faces 44 and 45 are formed on the cutting edge 41 to maintain its sharpness permanently. The cutting edges of the blades must be kept sharp for the best performance of the plow, and this is especially important in cutting through grain stubble, corn stalks and various cover crops which are to be plowed under. When the blades are in sharp condition, they cut all this vegetable material into short lengths and distribute it evenly through the soil for rapid disintegration to enrich the soil and to offer the least interference with the planting and growing of a crop on the ground thus treated.

Various changes may be made in the construction and arrangement of parts without departing from the spirit of the invention, and all such modifications within the scope of the appended claims are included in the invention.

Having now described my invention and in what manner the same may be used, what I claim as new and desire to protect by Letters Patent is:

1. A rotary moldboard plow comprising a shaft, a plurality of collars on said shaft, a clamping ring on each of said collars, a plurality of cutting blades adapted for mounting on said collars, said rings being rotatable on said collars to clamp said blades thereon.

2. A rotary moldboard plow comprising a shaft, a plurality of collars on said shaft, a plurality of cutting blades adapted for mounting on said collars, and a ring on each of said collars rotatable in one direction to clamp a blade on the collar and rotatable in the opposite direction to release said blade.

3. A rotary moldboard plow comprising a shaft, a plurality of collars on said shaft, a rotatable ring on each of said collars, opposed wedging surfaces on said collars and rings, and cutting blades adapted to be secured on said collars between said wedging surfaces.

4. In an earth working implement, a collar adapted for mounting fixedly in selected angular position on a shaft, a socket in said collar, and a clamping ring rotatable on said collar and having a wedging surface forming a wall of said socket to clamp a blade therein.

5. A rotary plow comprising a driven shaft mounted in a direction generally perpendicular to the line of draft, a plurality of flanged collars mounted on said shaft, blades mounted on selected ones of said collars spaced along said shaft, each said blade having an arcuate base portion fitting said collar with said base disposed transversely of said shaft, and a ring mounted on said collar and rotatable relative to said flanged portion for securing said blade in a selected angular position relative to said shaft.

6. A rotary plow comprising a driven shaft mounted in a direction generally perpendicular to the line of draft, a plurality of flanged collars mounted on said shaft, means for adjusting the angular positions of said collars relative to said shaft, blades mounted on selected ones of said collars spaced along said shaft, each said blade having an arcuate base portion fitting said collar, means cooperating with the flanged portion of each collar to mount said blade with said base disposed transversely of said shaft, and an abutment on said collar for transmitting the torque of the shaft to the blade.

7. A rotary plow comprising a driven shaft mounted in a direction generally perpendicular to the line of draft, a plurality of collars mounted on said shaft, means on said shaft for adjusting the angular positions of said collars relative to said shaft, each collar having a cylindrical sleeve portion and a flange portion, blades mounted on selected ones of said collars spaced along said shaft, each said blade having an arcuate base portion fitting said sleeve, means cooperating with said flange to mount said blade with said base disposed transversely of said shaft, each said blade extending generally radially from said shaft and being curved in both radial and transverse directions to present a spiral surface having sufficient pitch to deflect soil in an axial direction and turn it over.

8. A rotary plow comprising a driven shaft mounted in a direction generally perpendicular to the line of draft, a plurality of flanged collars mounted on said shaft, blades mounted on selected ones of said collars spaced along said shaft, means for adjusting the angular positions of said blades relative to said shaft, means cooperating with said collars to mount said blades with their bases disposed transversely of said shaft, each blade extending generally radially of said shaft and being curved in both radial and transverse directions and having a spiral surface of sufficient pitch to deflect soil in an axial direction and turn it over.

HAROLD F. HALL.

References Cited in the file of this patent

UNITED STATES PATENTS

| Number | Name | Date |
| --- | --- | --- |
| 645,597 | Keller et al. | Mar. 20, 1900 |
| 1,054,571 | Lamb | Feb. 25, 1913 |
| 1,076,745 | Ciccolini | Oct. 28, 1913 |
| 1,082,357 | Playford | Dec. 23, 1913 |
| 1,114,839 | Wohlrab | Oct. 27, 1914 |
| 1,309,801 | Haderer | July 15, 1919 |
| 1,402,878 | Matoushek | Jan. 10, 1922 |
| 1,744,597 | Vasconcellos | Jan. 21, 1930 |
| 1,787,695 | McKee | Jan. 6, 1931 |
| 1,832,429 | Sherman et al. | Nov. 17, 1931 |
| 1,870,044 | Fellmeth | Aug. 2, 1932 |
| 2,244,099 | Chase | June 3, 1941 |
| 2,262,885 | Condo | Nov. 18, 1941 |
| 2,356,072 | Mahler | Aug. 15, 1944 |

FOREIGN PATENTS

| Number | Country | Date |
| --- | --- | --- |
| 244,386 | Germany | Mar. 7, 1912 |